US00RE49922E

(19) United States
(12) Reissued Patent
Lee et al.

(10) Patent Number: US RE49,922 E
(45) Date of Reissued Patent: *Apr. 16, 2024

(54) ORGANIC LIGHT EMITTING DISPLAY DEVICE AND DRIVING METHOD THEREOF

(71) Applicant: Samsung Display Co., Ltd., Yongin-si (KR)

(72) Inventors: Sang-Hyun Lee, Yongin-si (KR); Jong-Woon Kim, Yongin-si (KR)

(73) Assignee: Samsung Display Co., Ltd., Yongin-si (KR)

( * ) Notice: This patent is subject to a terminal disclaimer.

(21) Appl. No.: 16/796,896

(22) Filed: Feb. 20, 2020

Related U.S. Patent Documents

Reissue of:
(64) Patent No.: 9,898,963
Issued: Feb. 20, 2018
Appl. No.: 14/945,216
Filed: Nov. 18, 2015

U.S. Applications:
(63) Continuation of application No. 14/038,562, filed on Sep. 26, 2013, now Pat. No. 9,208,727.

(30) Foreign Application Priority Data

May 13, 2013 (KR) ..... 10-2013-0053666

(51) Int. Cl.
*G09G 3/3241* (2016.01)
*G09G 3/3291* (2016.01)

(52) U.S. Cl.
CPC ..... *G09G 3/3241* (2013.01); *G09G 3/3291* (2013.01); *G09G 2300/0426* (2013.01); *G09G 2300/0819* (2013.01); *G09G 2300/0842* (2013.01); *G09G 2300/0861* (2013.01); *G09G 2310/0243* (2013.01)

(58) Field of Classification Search
CPC ..... G09G 3/3241
See application file for complete search history.

(56) References Cited

U.S. PATENT DOCUMENTS

2005/0200291 A1 9/2005 Naugler, Jr. et al.
2006/0107146 A1 5/2006 Kim et al.
2010/0156875 A1 6/2010 Kim et al.
2011/0134100 A1 6/2011 Chung et al.
(Continued)

FOREIGN PATENT DOCUMENTS

KR 10-2007-0019463 2/2007
KR 10-2012-0044504 A 5/2012
KR 10-2012-0048294 A 5/2012

*Primary Examiner* — Cameron Saadat
(74) *Attorney, Agent, or Firm* — Lewis Roca Rothgerber Christie LLP

(57) ABSTRACT

An organic light emitting display device is disclosed. One inventive aspect includes a plurality of pixels provided at a region sectioned by scan lines and data lines and an initialization power unit. The plurality of pixels are configured to control the amount of a current flowing from a first power source to a second power source through an organic light emitting diode in response to a data signal. The initialization power unit supplies initialization power to a driving transistor within each pixel circuit. The initialization power unit further controls the voltage of the initialization power supply to maintain a substantially constant voltage difference between the second power source and the initialization power.

24 Claims, 3 Drawing Sheets

(56) References Cited

U.S. PATENT DOCUMENTS

| | | | |
|---|---|---|---|
| 2012/0001893 | A1 | 1/2012 | Jeong et al. |
| 2012/0028422 | A1* | 2/2012 | Kwon ..... H01L 29/78603 438/166 |
| 2012/0105410 | A1 | 5/2012 | Choi et al. |
| 2012/0113077 | A1 | 5/2012 | Kang |

* cited by examiner

ORGANIC LIGHT EMITTING DISPLAY DEVICE AND DRIVING METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application is a continuation of application Ser. No. 14/038,562, filed on Sep. 26, 2013 which claims priority to and the benefit of Korean Patent Application No. 10-2013-0053666, filed on May 13, 2013, in the Korean Intellectual Property Office, the entire contents of which are incorporated herein by reference in their entirety.] *This application is a reissue application of U.S. Pat. No. 9,898,963, issued on Feb. 20, 2018, which is a continuation of U.S. application Ser. No. 14/038,562, filed on Sep. 26, 2013, now U.S. Pat. No. 9,208,727, and which claims priority to and the benefit of Korean Patent Application No. 10-2013-0053666, filed on May 13, 2013, in the Korean Intellectual Property Office, the entire contents of which are incorporated herein by reference in their entirety.*

BACKGROUND

Field

The disclosed technology relates generally to an organic light emitting diode (OLED) display panel and more particularly, to a pixel circuit, an initialization circuit, and a method of driving the panel.

Description of the Related Technology

Recently, various flat panel display technologies have been developed which have less weight and volume than traditional cathode ray tube (CRT) displays that are bulky and heavy. Such flat panel technologies include liquid crystal display, field emission display, plasma display panel, organic light emitting diode display among others.

Among these displays, OLED technology displays images using organic light emitting diodes that generate light by recombining electrons and holes. These displays are characterized by fast response speed and low power consumption.

SUMMARY OF CERTAIN INVENTIVE ASPECTS

Various inventive aspects relate to an organic light emitting display device and a method of driving the same.

In one aspect, an organic light emitting display device includes: a plurality of pixels provided at a region sectioned by scan lines and data lines and an initialization power unit. The plurality of pixels are configured to control an amount of a current flowing from a first power source to a second power source through an organic light emitting diode in response to a data signal. The initialization power unit is configured to supply an initialization power to a driving transistor included in each pixel. The initialization power unit is further configured to control a voltage of the initialization power to maintain a substantially constant voltage difference between the second power source and the initialization power unit.

In another exemplary embodiment of the organic light emitting display device, the initialization power unit is set to have a voltage lower than the second power source.

In another exemplary embodiment of the organic light emitting display device, the initialization power unit includes a measurement unit configured to measure a voltage of the second power source and a generator configured to generate the initialization power to maintain the substantially constant voltage difference between the second power source measured by the measurement unit and the initialization power unit.

In another exemplary embodiment of the organic light emitting display device, the initialization power unit includes a comparator configured to compare a voltage difference between an external initialization power that the comparator receives from an outside device and the second power source and a generator configured to generate the initialization power by controlling a voltage of the external initialization power to maintain the substantially constant voltage difference between the second power source and the initialization power in response to a comparison result by the comparator.

In another exemplary embodiment of the organic light emitting display device, the initialization power unit is configured to output either the external initialization power or the initialization power in response to a control signal supplied from the outside.

In another exemplary embodiment of the organic light emitting display device, each of the pixels includes a pixel circuit including the driving transistor and a first transistor between an anode electrode of the organic light emitting diode and the initialization power.

In another exemplary embodiment of the organic light emitting display device, the first transistor is connected to one of the scan lines. Each of the pixel circuits is connected to at least one scan line, light emitting control line and data line.

In another exemplary embodiment of the organic light emitting display device, each of the pixel circuits on a jth horizontal line (where j is a natural number) includes the driving transistor configured to control an amount of a current flowing from the first power source to the organic light emitting diode connected through a first node in response to a voltage of a second node, a fifth transistor turned on when a scan signal is supplied to a jth scan line, a third transistor turned on when the scan signal is supplied to a j−1th scan line, and a fourth transistor connected between a second node and a second electrode of the driving transistor and turned on when the scan signal is supplied to the jth scan line.

In another exemplary embodiment of the organic light emitting display device, the first transistor of each of the pixels located on the jth horizontal line is connected to a j+1th scan line.

In another exemplary embodiment of the organic light emitting display device, each of the pixel circuits on the jth horizontal line (where j is a natural number) further includes: a sixth transistor connected between the first node and the first power source, turned off when a light emitting control signal is supplied to a jth light emitting control line and turned on in all other circumstances, and a seventh transistor connected between a second electrode of the first transistor and an anode electrode of the organic light emitting diode, turned off when the light emitting control signal is supplied to the jth light emitting control line and turned on in all other circumstances.

In an embodiment, a method of driving an organic light emitting display device having the pixel configured to control the amount of the current flowing from the first power source to the second power source through the organic light emitting diode is provided. The method includes: generating the initialization power to maintain the substantially constant voltage difference between the second power source and the initialization power and supplying the voltage of the initialization power to the driving transistor of the pixel before the data signal is supplied.

In another exemplary embodiment of the method of driving an organic light emitting display device having the pixel configured to control the amount of the current flowing from the first power source to the second power source through the organic light emitting diode, generating of the initialization power further includes measuring the voltage of the second power source and generating the initialization power to have the voltage difference between the second power source and the initialization power.

In another exemplary embodiment of the method of driving an organic light emitting display device having the pixel configured to control the amount of the current flowing from the first power source to the second power source through the organic light emitting diode, generating of the initialization power further includes comparing a voltage difference between the external initialization power supplied from the outside and the second power source and generating the initialization power by controlling the voltage of the external initialization power to have the voltage difference between the second power source and the initialization power in response to a comparison result.

BRIEF DESCRIPTION OF THE DRAWINGS

Exemplary embodiments will now be described more fully hereinafter with reference to the accompanying drawings; however, they may be embodied in different forms and should not be construed as limited to the embodiments set forth herein. Rather, these embodiments are provided so that this disclosed technology will be thorough and complete, and will filly convey the scope of the exemplary embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF CERTAIN INVENTIVE EMBODIMENTS

Figure 1:
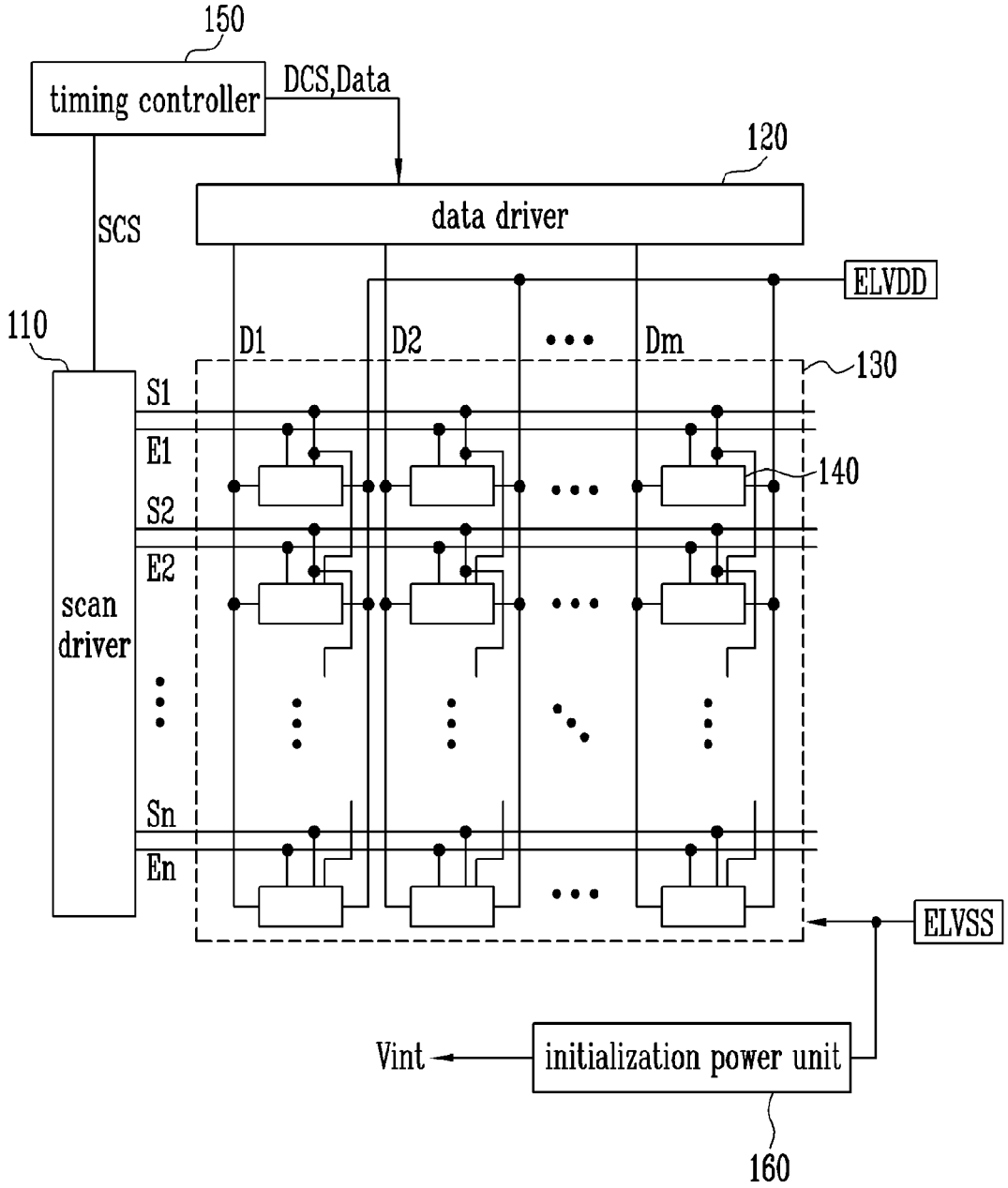
FIG. 1 is a diagram illustrating an organic light emitting display device according to an embodiment.

Hereinafter, certain exemplary embodiments according to the disclosed technology will be described in detail with reference to the accompanying drawings, in which exemplary embodiments of the disclosed technology are shown. As those skilled in the art would realize, the described embodiments may be modified in various different ways, all without departing from the spirit or scope of the disclosed technology.

The drawings and description are to be regarded as illustrative in nature and not restrictive. Like reference numerals designate like elements throughout the specification.

Further, since sizes and thicknesses of constituent members shown in the accompanying drawings are arbitrarily given for better understanding and ease of description, the disclosed technology is not limited to the illustrated sizes and thicknesses.

In the drawings, the thickness of layers, films, panels, regions, etc., are exaggerated for clarity. In the drawings, for better understanding and ease of description, the thicknesses of some layers and areas are exaggerated. It will be understood that when an element such as a layer, film, region, or substrate is referred to as being "on" another element, it may be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Throughout this specification, it is understood that the term "on" and similar terms are used generally and are not necessarily related to a gravitational reference.

In addition, in the accompanying drawings, an organic light emitting diode OLED display is illustrated as an active matrix (AM)-type OLED display in a 6Tr-1Cap structure in which six thin film transistors (TFTs) and one capacitor are formed in one pixel, but the disclosed technology is not limited thereto. Therefore, the OLED display has various structures. For example, a matrix of TFTs and at least one capacitor is provided in one pixel of the OLED display, and separate wires are further provided in the OLED display. Here, the pixel refers to a minimum unit for displaying an image, and the OLED display generates an image by using a matrix of pixels.

FIG. 1 is a diagram illustrating an organic tight emitting display device according to an exemplary embodiment.

Referring to FIG. 1, an organic light emitting display device according to the exemplary embodiment includes a pixel unit 130, a scan driver 110, a data driver 120, an initialization power unit 160 and a timing controller 150. The pixel unit 130 has pixels 140 at a region sectioned by scan lines S1 to Sn and data lines D1 to Dm. The scan driver 110 is configured to drive the scan lines S1 to Sn and light emitting control lines E1 to En. The data driver 120 is configured to drive the data lines D1 to Dm. The initialization power unit 160 is configured to generate an initialization power Vint. The timing controller 150 is configured to control the scan driver 110 and the data driver 120.

In one exemplary implementation, the timing controller 150 may generate at least one of a data driving control signal DCS and a scan driving control signal SCS in response to synchronized signals supplied from outside. The data driving control signal DCS is supplied to the data driver 120 and the scan driving control signal SCS is supplied to the scan driver 110. The data driving control signal DCS is generated by the timing controller 150. The timing controller 150 may supply data from the outside to the data driver 120.

The scan driver 110 may receive the scan driving control signal SCS from the timing controller 150. The scan driver 110 may generate scan signals and supply the generated scan signals to at least one of the scan lines S1 to Sn. In another implementation, the scan driver 110 may generate one or more light emitting control signals in response to the scan driving control signal SCS and supply the generated light emitting control signals to at least one of the light emitting control lines E1 to En. The width of the light emitting control signal is set to be either the same or wider than a width of at least one of the scan signal. As a non-limiting example, a light emitting control signal is supplied to an ith light emitting control line Ei (where i is a natural number) such that the light emitting control signal may overlaps a scan signal supplied to at least one of the i−1th and ith scan lines Si−1 and Si.

The data driver 120 may receive the data driving control signal DCS from the timing controller 150. The data driver 120 may generate one or more data signals and supply the generated data signals to the data lines D1 to Dm such that the generated data signals are synchronized with at least one of the scan signals.

The pixel unit 130 may include the pixels 140 at the region sectioned by at least one of the scan lines S1 to Sn and at least one of the data lines D1 to Dm. The pixels 140 may receive at least one of a first power source ELVDD and a second power source ELVSS. The second power source ELVSS is set to a voltage lower than the first power source ELVDD from the outside.

In some implementations, each of the pixels 140 includes a driving transistor and an organic light emitting diode that are not shown in the drawings. The driving transistor may control an amount of current flowing from the first power source ELVDD to the second power source ELVSS through the organic light emitting diode OLED in response to a data signal. In order to compensate a threshold voltage of the driving transistor, the driving transistor is diode-coupled while the data signal is supplied. Each of the pixels 140 may initialize the gate electrode voltage of the driving transistor using the initialization power Vint from the initialization power unit 160 before the data signal is supplied.

In some other implementations, each of the pixels includes a first transistor (which is not shown in FIG. 1) between the initialization power Vint and an anode electrode of the organic light emitting diode such that display qualities or display characteristics is improved. The first transistor may provide a leakage path from the anode electrode of the organic light emitting diode to the initialization power Vint. As such, black expression capabilities of the display are enhanced.

The initialization power unit 160 may generate the initialization power Vint and provide the generated initialization power Vint to each of the pixels 140. The initialization power unit 160 may control the voltage of the initialization power Vint and maintain a steady substantially constant voltage difference between the second power source ELVSS and the initialization power Vint.

A voltage of the second power source ELVSS may change in response to a load of the pixel unit 130. In other words, the voltage of the second power source ELVSS may change in response to an image displayed at the pixel unit 130. The initialization power unit 160 may control the voltage of the initialization power Vint and maintain a voltage difference between the second power source ELVSS and the initialization power Vint in response to the voltage change of the second power source ELVSS. The initialization power Vint is set to a voltage tower than the second power source ELVSS.

Figure 2:
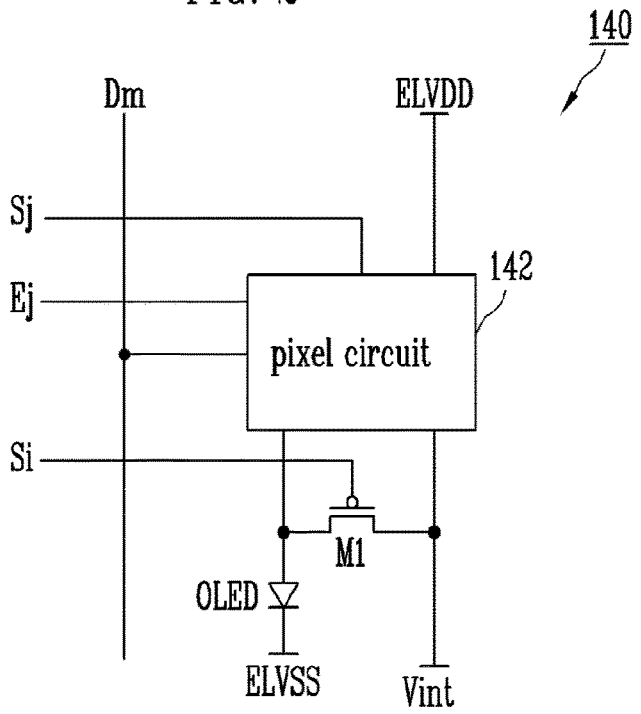
FIG. 2 is a diagram illustrating a pixel according to an embodiment.

FIG. 2 is a diagram illustrating a pixel according to an embodiment. In FIG. 2, the pixel 140 is shown to be connected to a data line Dm and be located in the jth horizontal line (where j is a natural number)

Referring to FIG. 2, the pixel 140 according to the exemplary embodiment includes an organic light emitting diode OLED, a pixel circuit 142 and a first transistor M1. The pixel circuit 142 is configured to control an amount of a current supplied to the organic light emitting diode OLED. The first transistor M1 is connected to an anode electrode of the organic light emitting diode OLED and an initialization power Vint.

In one implementation, the organic light emitting diode OLED generates light of a predetermined brightness in response to an amount of a current supplied from the pixel circuit 142.

The pixel circuit 142 may initialize a voltage of a gate electrode of a driving transistor using the initialization power Vint. The pixel circuit 142 may receive a data signal from the data line Dm when a scan signal is supplied to a scan line Sj and store the received data signal. The pixel circuit 142 may control an amount of current flowing from a first power source ELVDD to the second power source ELVSS through the organic light emitting diode OLED in response to the data signal. The pixel circuit 142 may receive the initialization power Vint and be formed in various shapes or states.

The first transistor M1 is connected between the anode electrode of the organic light emitting diode OLED and the initialization power Vint. The first transistor M1 may provide a leakage path so that a predetermined current may flow to the initialization power Vint from the anode electrode of the organic light emitting diode OLED. The black expression capabilities are enhanced due to a leakage current by the first transistor M1.

The first transistor M1 is turned on when the scan signal is supplied to the ith scan line (where i may be any one of S1 to Sn). The turning on timing for the first transistor M1 is set in various manners based on, including without limitation, an initialization of the organic light emitting diode OLED, an enhancement in black expression capabilities, etc.

Figure 3:
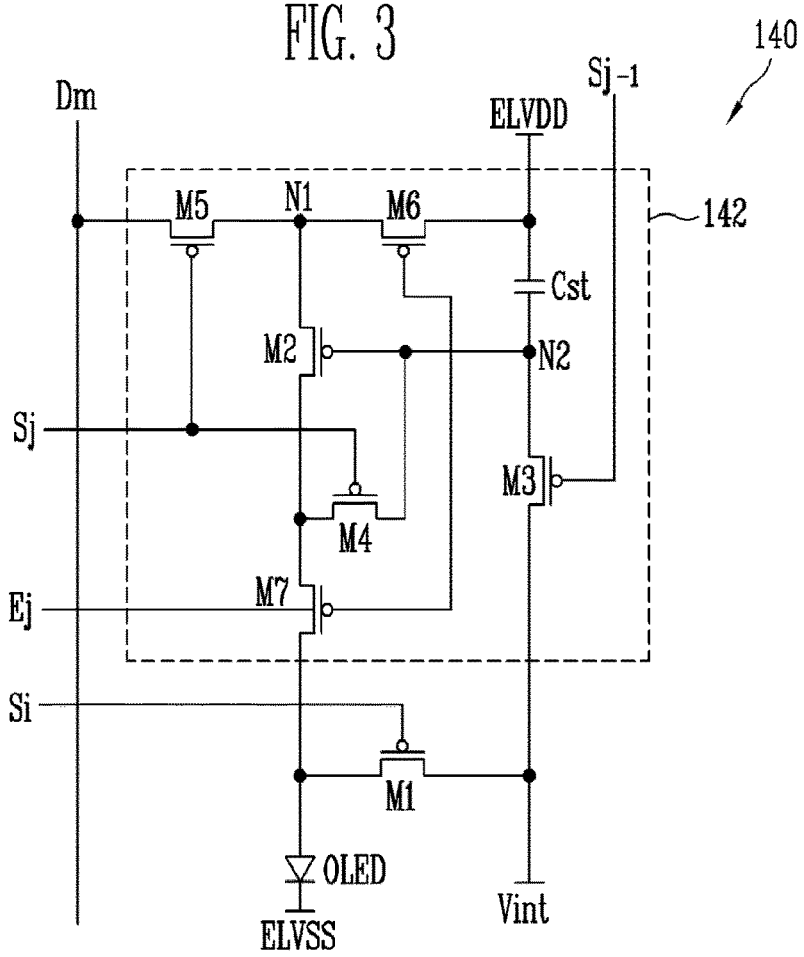
FIG. 3 is a diagram illustrating an embodiment of a pixel circuit shown in FIG. 2.

FIG. 3 is a diagram illustrating an embodiment of a pixel circuit shown in FIG. 2.

Referring to FIG. 3, the pixel circuit 142 includes a second transistor M2, a third transistor M3, a fourth transistor M4, a fifth transistor M5, a sixth transistor M6, a seventh transistor M7 and a storage capacitor Cst.

In one implementation, a first electrode of the fifth transistor M5 is connected to the data line Dm and a second electrode of the fifth transistor M5 is connected to a first node N1. A gate electrode of the fifth transistor M5 is connected to a scan line Sj. The fifth transistor M5 may supply a data signal received from a data line Dm to the first node N1 as the fifth transistor is turned on when the scan signal is supplied to the scan line Sj.

A first electrode of the second transistor M2 (i.e., a driving transistor) is connected to the first node N1 and a second electrode of the second transistor M2 is connected to a first electrode of the seventh transistor M7. A gate electrode of the second transistor M2 is connected to a second node N2. The second transistor M2 may control an amount of current flowing from a first power source ELVDD to a second power source ELVSS through an organic light emitting diode OLED in response to a voltage charged to the storage capacitor Cst.

A first electrode of the third transistor M3 is connected to the second node N2 and the second node N2 is further connected to an initialization power Vint. A gate electrode of the third transistor M3 is connected to the scan line Sj−1. The third transistor M3 may supply a voltage of the initialization power Vint to the second node N2 as it is turned on when the scan signal is supplied to the scan line Sj−1. The initialization power Vint is set to a voltage tower than the data signal.

A first electrode of the fourth transistor M4 is connected to a second electrode of the second transistor M2. The second electrode of the second transistor M2 is connected to the second node N2. A gate electrode of the fourth transistor M4 is connected to the scan line Sj. The fourth transistor M4 is turned on when the scan signal is supplied to the scan line Sn and may diode-couple the second transistor M2.

A first electrode of the sixth transistor M6 is connected to the first power source ELVDD. The second electrode of the sixth transistor M6 is connected to the first node N1. A gate electrode of the sixth transistor M6 is connected to a light emitting control line Ej. The sixth transistor M6 is turned off when a light emitting control signal is supplied to the light emitting control line Ej and is turned on when the light emitting control signal is not supplied.

A first electrode of the seventh transistor M7 is connected to the second electrode of the second transistor M2, and the second electrode of the second transistor M2 is connected to the anode electrode of the organic light emitting diode OLED. A gate electrode of the seventh transistor M7 is connected to the light emitting control line Ej. The seventh transistor M7 is turned off when the light emitting control signal is supplied to the light emitting control line Ej and is turned off when the light emitting control signal is not supplied.

Figure 4:
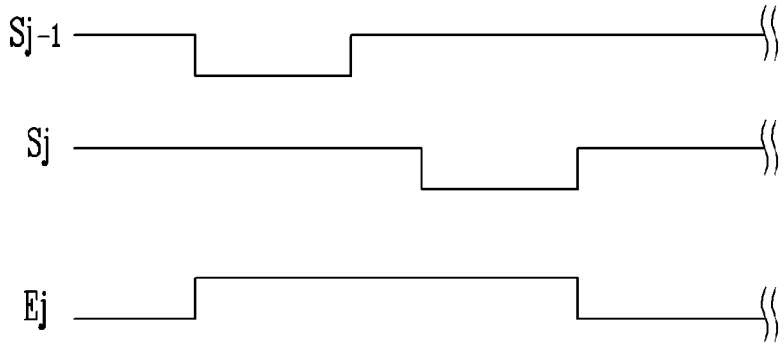
FIG. 4 is a timing diagram illustrating a method of driving a pixel shown in FIG. 3.

FIG. 4 is a timing diagram illustrating a method of operating a pixel shown in FIG. 3.

Referring to FIGS. 3 and 4, the sixth transistor M6 and the seventh transistor M7 are turned off as the light emitting control signal is supplied to the light emitting control line Ej. When the sixth transistor M6 is turned off, the first power source ELVDD and the first node N1 are electrically blocked. When the seventh transistor M7 is turned off, the second transistor M2 and the organic light emitting diode OLED are electrically blocked. While the light emitting control signal is supplied, the pixel 140 is set to a non-light emitting state.

The scan signal is supplied to the scan line Sj−1. When the scan signal is supplied to the scan line Sj−1, the third transistor M3 is turned on. When the third transistor M3 is turned on, the voltage of the initialization power Vint is supplied to the second node N2.

After the voltage of the initialization power Vint is supplied to the second N2, the scan signal is supplied to the jth scan line Sj. When the scan signal is supplied to the jth scan line Sj, the fourth transistor M4 and the fifth transistor M5 are turned on.

When the fourth transistor M4 is turned on, the second transistor M2 is diode-coupled. When the fifth transistor M5 is turned on, the data signal is supplied to the first node N1 from the data line Dm. Since the second node N2 is initialized to the voltage of the initialization power Vint, the second transistor M2 is turned on. The voltage obtained from subtracting the threshold voltage of the second transistor M2 from the voltage of the data signal applied to the first node N1 is applied to the second node N2, which the storage capacitor Cst stores in the second node N2.

After a predetermined voltage is charged to the storage capacitor Cst, the sixth transistor M6 and the seventh transistor M7 are turned on because the supply of the light emitting control signal is stopped to the light emitting control line Ej. When the sixth transistor M6 and the seventh transistor M7 are turned on, a current path is formed from the first power source ELVDD to the second power source ELVSS through the organic light emitting diode. The second transistor M2 may control the amount of the current flowing from the first power source ELVDD to the organic light emitting diode in response to the voltage charged to the storage capacitor Cst.

The first transistor M1 is turned on when the scan signal is supplied to the ith scan line Si. The ith scan line Si is set to a scan line Sj+1. The first transistor M1 is turned on when the scan signal is supplied to the scan line Sj+1 and supplies the current supplied from the second transistor M2 to the initialization power Vint. As a result, the light emitting by the organic light emitting diode OLED due to an unnecessary current is prevented when implementing brightness of black.

The first transistor M1 provides a path for a predetermined leakage current to flow from the organic light emitting diode OLED to the initialization power Vint during the period in which the scan signal is not being supplied to the scan line Sj+1. When the organic light emitting diode OLED emits light, much current is supplied to the organic light emitting diode OLED, and accordingly, the leakage current affects the brightness very little. On the other hand, when gradation of black is implemented, a micro current is supplied from the pixel circuit 142 to the organic light emitting diode OLED. In this case, the leakage current of the first transistor M1 greatly affects the light emitting by the organic light emitting diode OLED. When the gradation of black is implemented, the light emitting by the organic light emitting diode OLED is prevented by the leakage current of the first transistor M1.

When the voltage of the second power source ELVSS changes in response to the load of the pixel unit 130, there is a color coordinate twist phenomenon due to a change in the amount of the leakage current that flows through the first transistor M1. In order to prevent such phenomenon, the steady voltage difference between the second power source ELVSS and the initialization power Vint is maintained using the initialization power unit 160. As a result, the amount of the leakage current by the first transistor M1 is steady, and accordingly, the color coordinate twist phenomenon is prevented from occurring.

Figure 5:
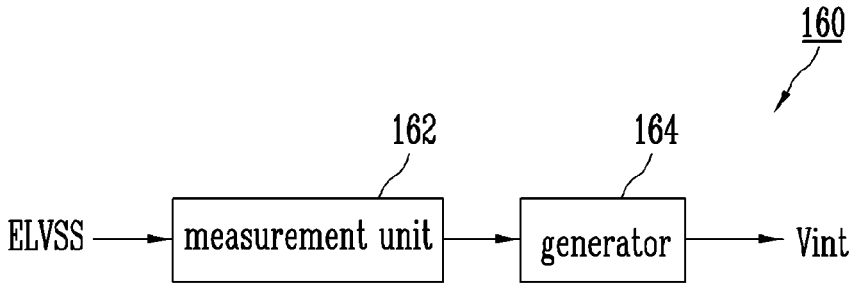
FIG. 5 is a diagram illustrating an initialization power unit according to an embodiment.

FIG. 5 is a diagram illustrating an initialization power unit according to an embodiment.

Referring to FIG. 5, the initialization power unit 160 according to an embodiment comprises a measurement unit 162 and a generator 164.

The measurement unit 162 is supplied with the second power source ELVSS from the outside power unit and measures the supplied voltage of the second power source ELVSS.

The generator 164 generates the initialization power Vint to have the steady voltage difference between the voltage of the second power source ELVSS measured by the measurement unit 162 and the initialization voltage Vint. The generator 164 may generate the initialization power Vint to have a voltage lower than the measured second power source ELVSS. When the voltage difference between the second power source ELVSS and the initialization power Vint is maintained, the amount of the leakage current that flows through the first transistor M1 is maintained and accordingly, display qualities are enhanced.

Figure 6:
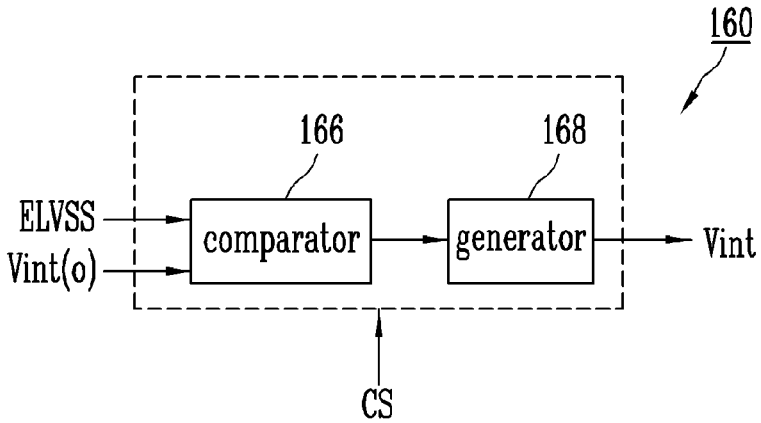
FIG. 6 is a diagram illustrating an initialization power unit according to an embodiment.

FIG. 6 is a diagram illustrating an initialization power unit according to an embodiment.

Referring to FIG. 6, the initialization power unit 160 according to an embodiment may include a comparator 166 and a generator 168.

The comparator 166 is supplied with the second power source ELVSS and external initialization power Vint(o) from the outside. The external initialization power Vint(o) may refer to the initialization power generally used in a pixel in which the driving transistor is diode-coupled. The external initialization power Vint(o) is generated in a power unit, etc. (not shown).

The comparator 166 that is supplied with the second power source ELVSS and the external initialization power Vint(o) may sense the voltage difference between the second power source ELVSS and the external initialization power Vint(o) and supply the sensed voltage difference to the generator 168.

The generator 168 may generate the initialization power Vint by controlling the voltage of the external initialization power Vint(o) such that the second power source ELVSS and the external initialization power Vint(o) has a steady voltage difference in response to results of the sensing by the comparator 166. The generator 168 may generate the initialization power Vint such that it has a voltage that is 1V lower than the second power source ELVSS. When the voltage difference between the second power source ELVSS and the initialization power Vint is maintained to be substantially constant, the amount of the leakage current flowing through the first transistor M1 is maintained to be substantially constant, and accordingly display qualities are enhanced.

The initialization power unit 160 according to an embodiment may additionally receive the control signal CS from the timing controller 150. The initialization power unit 160 may receive the control signal CS and selectively output the external initialization power Vint(o) and the initialization power Vint. That is, the initialization power unit 160 may additionally have the function of selectively outputting the external initialization power Vint(o) and the initialization power Vint in response to the control signal CS.

The transistors are illustrated as PMOS in the drawings, but the disclosed technology is not limited thereto. In other words, the transistors are formed as NMOS.

The organic light emitting diode OLED may generate light having a particular color in response to an amount of a current supplied from the driving transistor, but the disclosed technology is not limited thereto. The organic light emitting diode OILED may generate light having a white color in response to the amount of the current supplied from the driving transistor. In this case, a colored image is implemented using additional color filters, etc.

By way of summation and review, an organic light emitting display device comprises a matrix of pixels arranged in a matrix pattern at an intersection of a matrix of data lines, scan lines and power lines. The matrix of pixels include a driving transistor configured to control an organic light emitting diode and an amount of a current generally flowing to the organic light emitting diode. The pixels generate light having a predetermined brightness while the pixels supplies a current to the organic light emitting diode OLED from the driving transistor in response to a data signal.

The organic light emitting diode may emit light even with a low current due to improvement in the efficiency and resolution of the organic light emitting diode. In this case, the advantage is that an image having a high brightness can be made while reducing consumption power.

However, if the organic light emitting diode emits light even at a low current, the brightness of black may increase. In other words, when black is expressed at the pixels, the organic light emitting diode has micro luminescence due to the leakage current. As such, the contrast ratio may decrease.

The organic light emitting display device and method of operating the same form a leakage passage leading from the anode electrode of the organic light emitting diode to the initialization power. As such, black expression capabilities are enhanced. In addition, a second power source and a voltage of the initialization power are maintained to be substantially constant and deterioration in quality due to a change in color coordinate is prevented.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the disclosed technology as set forth in the following claims.

For purposes of summarizing the disclosed technology, certain aspects, advantages and novel features of the disclosed technology have been described herein. It is to be understood that not necessarily all such advantages may be achieved in accordance with any particular embodiment of the disclosed technology. Thus, the disclosed technology may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the disclosed technology. Thus, the disclosed technology is not intended to be limited to the embodiments shown herein but is to be accorded the widest scope consistent with the principles and novel features disclosed herein.

What is claimed is:

1. An organic light emitting display device, comprising:

a plurality of pixels formed in a region defined by intersections of a plurality of scan lines and a plurality of data lines, the pixels being configured to control an amount of current flowing from a first power source to a second power source through an organic light emitting diode in response to at least a data signal; and an initialization power generator configured to supply an initialization power to a driving transistor of one of the plurality of pixels, wherein the initialization power generator is configured to control a voltage of the initialization power to maintain a constant voltage difference between the second power source and the initialization power, and wherein a voltage of the second power source and the voltage of the initialization power are different, wherein one of the plurality of the pixels further comprises a first transistor electrically connected between the organic light emitting diode and the initialization power voltage, the first transistor being configured such that leakage current flowing therethrough is independent of changes in the load to the pixels.

2. The organic light emitting display device of claim 1, wherein the initialization power is set to have a voltage lower than the second power source.

3. The organic light emitting display device of claim 1, wherein the initialization power generator further comprises:

a voltage meter configured to measure a voltage of the second power source; and a voltage generator configured to generate the initialization power to maintain the constant voltage difference between the second power source and the initialization power based on the measured voltage.

4. The organic light emitting display device of claim 1, wherein the initialization power generator comprises:

a comparator configured to compare a voltage difference between an external initialization power supplied from an external device and the second power source; and a generator configured to generate the initialization power by controlling a voltage of the external initialization power to maintain the constant voltage difference between the second power source and the initialization power in response to a comparison result generated by the comparator.

5. The organic light emitting display device of claim 4, wherein the initialization power generator outputs at least any one of the external initialization power and the initialization power in response to a control signal supplied from the external device.

6. The organic light emitting display device of claim 1, wherein each of the pixels comprises:

a pixel circuit comprising the driving transistor, wherein the first transistor is electrically connected between an anode electrode of the organic light emitting diode and the initialization power.

7. The organic light emitting display device of claim 6, wherein the first transistor is connected to any one of the scan lines.

8. The organic light emitting display device of claim 6, wherein each of the pixels is connected to at least one scan line, light emitting control line and data line.

9. The organic light emitting display device of claim 8, wherein each of the pixels on a jth horizontal line (where j is a natural number) comprises:

the driving transistor configured to control an amount of a current from the first power source to the organic light emitting diode connected through a first node in response to a voltage of a second node;

a fifth transistor between a data line and the first node and turned on when a scan signal is supplied to a jth scan line;

a third transistor connected between the second node and the initialization power and turned on when the scan signal is supplied to a j−1th scan line; and a fourth transistor connected between the second node and a second electrode of the driving transistor and turned on when the scan signal is supplied to the jth scan line.

10. The organic light emitting display device of claim 9, wherein the first transistor of each of the pixels on the jth horizontal line is connected to a [j+1 th] *j+1th* scan line.

11. The organic light emitting display device of claim 9, wherein each of the pixels on a jth horizontal line (where j is a natural number) further comprises:

a sixth transistor connected between the first node and the first power source, the sixth transistor turned off when a light emitting control signal is supplied to a jth light emitting control line, and the sixth transistor turned on when the light emitting control signal is not supplied to the jth light emitting control line; and a seventh transistor connected between a second electrode of the first transistor and the anode electrode of the organic light emitting diode, turned off when the light emitting control signal is supplied to the jth light emitting control line and turned on in all other situations.

12. A method of driving an organic light emitting display device comprising a pixel configured to control an amount of a current flowing from a first power source to a second power source through an organic light emitting diode, the method comprising:

generating an initialization power to maintain a constant voltage difference between the second power source and the initialization power, wherein the pixel comprises a first transistor electrically connected between the organic light emitting diode and the initialization power voltage, and wherein a voltage of the second power source and the voltage of the initialization power are different;

supplying a voltage of the initialization power to a driving transistor of the pixel before a data signal is supplied; and supplying a leakage voltage through the first transistor, wherein the leakage current is independent of changes in the load to the pixel.

13. The method of claim 12, wherein generating the initialization power comprises generating the initialization power having a voltage lower than the second power source.

14. The method of claim 12, wherein generating the initialization power comprises:

measuring a voltage of the second power source; and generating the initialization power to have the voltage difference between the second power source and the initialization power based on the measured voltage.

15. The method of claim 12, wherein generating the initialization power comprises:

comparing a voltage difference between an external initialization power and the second power source from an external device to generate a comparison result; and generating the initialization power by controlling a voltage of the external initialization power to maintain the constant voltage difference between the second power source and the initialization power in response to the comparison result.

16. The method of claim 15, wherein generating the initialization power comprising outputting at least any one of the external initialization power and the initialization power in response to a control signal sent from the external device.

17. The method of claim 12 further comprising:

controlling an amount of a current to the organic light emitting diode connected through a first node in response to a voltage of a second node;

turning on a fifth transistor between a data line and the first node when a scan signal is supplied to a jth scan line;

turning on a third transistor connected to the second node and the initialization power when the scan signal is supplied to a j−1th scan line; and turning on a fourth transistor connected between the second node and a second electrode of the driving transistor when the scan signal is supplied to the jth scan line.

18. The method of claim 17 further comprising:

turning off a sixth transistor connected to the first node and the first power source when a light emitting control signal is supplied to a jth light emitting control line;

turning on the sixth transistor when the light emitting control signal is not supplied to the jth light emitting control line;

turning off a seventh transistor connected to a second electrode of the first transistor of the pixel and an anode electrode of the organic light emitting diode when the light emitting control signal is supplied to the jth light emitting control line; and turning on the seventh transistor when the light emitting control signal is supplied to the jth light emitting control line.

*19. An organic light emitting display device, comprising:*

*pixels formed in a region defined by intersections of a plurality of scan lines and a plurality of data lines, the pixels being configured to control an amount of a current flowing from a first power source to a second power source through an organic light emitting diode in response to at least one data signal; and*

*an initialization power generator configured to supply at least one initialization power source to at least one of the pixels, wherein the initialization power generator is configured to control a voltage of the at least one initialization power source to maintain a constant voltage difference between the second power source and the at least one initialization power source, and wherein the voltage of the initialization power source is lower than a voltage of the second power source, and*

*wherein a first pixel of the pixels comprises a first transistor electrically connected between a first electrode of the organic light emitting diode and the at least one initialization power source, the first transistor being turned on in response to a scan signal supplied to a first scan line from among the scan lines to provide the at least one initialization power source to the first electrode of the organic light emitting diode, the first transistor providing a path through which a leakage current flows from the first electrode of the organic light emitting diode to the at least one initialization power source when the scan signal is not supplied to the first scan line.*

*20. The organic light emitting display device of claim 19, wherein the first pixel is connected to the first scan line, a second scan line, and a third scan line of the scan lines, one of the data lines, and a light emitting control line.*

*21. The organic light emitting display device of claim 20, wherein the first pixel comprises a driving transistor configured to control an amount of a current flowing from the first power source to the organic light emitting diode in response to a voltage of a second node.*

*22. The organic light emitting display device of claim 21, wherein the first pixel further comprises:*

*a third transistor connected between the second node and the at least one initialization power source, the third transistor turned on in response to a scan signal supplied to the second scan line;*

*a fourth transistor connected between the second node and a second electrode of the driving transistor, the fourth transistor turned on in response to a scan signal supplied to the third scan line; and*

*a fifth transistor between the one of the data lines and a first node, the fifth transistor turned on in response to a scan signal supplied to the third scan line.*

*23. The organic light emitting display device of claim 22, wherein the first pixel further comprises:*

*a sixth transistor connected between the first node and the first power source, the sixth transistor turned on in response to a light emitting control signal supplied to the light emitting control line; and*

*a seventh transistor connected between the second electrode of the driving transistor and the first electrode of the organic light emitting diode, the seventh transistor turned on in response to the light emitting control signal supplied to the light emitting control line.*

*24. An organic light emitting display device, comprising:*

*pixels formed in a region defined by intersections of a plurality of scan lines and a plurality of data lines, the pixels being configured to control an amount of a current flowing from a first power source to a second power source through an organic light emitting diode in response to at least one data signal; and*

*an initialization power generator configured to supply at least one initialization power source to at least one of the pixels, the initialization power generator controlling a voltage of the at least one initialization power source so that a voltage difference between the at least one initialization power source and the second power source is substantially constant,*

*wherein the voltage of the initialization power source is lower than the voltage of the second power source, and*

*wherein a first pixel of the pixels comprises a first transistor electrically connected between a first electrode of the organic light emitting diode and the at least one initialization power source, the first transistor being turned on in response to a scan signal supplied to a first scan line from among the scan lines to provide the at least one initialization power source to the first electrode of the organic light emitting diode, the first transistor providing a path through which a leakage current flows from the first electrode of the organic light emitting diode to the at least one initialization power source when the scan signal is not supplied to the first scan line.*

* * * * *